United States Patent [19]
Morgenthaler

[11] Patent Number: 6,062,526
[45] Date of Patent: May 16, 2000

[54] DIFFERENTIAL STIFFNESS SYSTEM FOR ATTENUATING VIBRATIONS

[75] Inventor: Daniel R. Morgenthaler, Littleton, Colo.

[73] Assignee: Lockheed Martin Corporation, Bethesda, Md.

[21] Appl. No.: 09/130,133

[22] Filed: Aug. 6, 1998

[51] Int. Cl.[7] .................................................. F16M 13/00
[52] U.S. Cl. ......................... 248/550; 188/380; 248/638
[58] Field of Search .................................. 248/550, 638, 248/575, 678, 676; 788/380

[56] References Cited

U.S. PATENT DOCUMENTS

| | | | |
|---|---|---|---|
| 4,901,573 | 2/1990 | Srinivasan et al. | 73/579 |
| 5,174,552 | 12/1992 | Hodgson et al. | 267/140.11 |
| 5,238,232 | 8/1993 | Kobayashi et al. | 267/140.14 |
| 5,328,141 | 7/1994 | Dickinson | 248/550 |
| 5,348,124 | 9/1994 | Harper | 188/378 |
| 5,366,198 | 11/1994 | Dickinson | 248/550 |
| 5,379,981 | 1/1995 | Leiderer | 248/550 |
| 5,427,347 | 6/1995 | Swanson et al. | 248/550 |
| 5,695,027 | 12/1997 | Von Flotow et al. | 180/380 |
| 5,924,670 | 7/1999 | Bailey et al. | 248/550 |

*Primary Examiner*—Ramon O. Ramirez
*Attorney, Agent, or Firm*—Holme Roberts & Owen LLP

[57] ABSTRACT

A vibration attenuation system (10) is disclosed for at least partially isolating a structure (16) from a vibrating source (14). The system (10) generally includes a differential stiffness assembly (12) interposed between the vibration source (14) and the structure (16), a vibration sensor (18) for sensing a vibration from the source (14), a controller (20) for controlling operation of the differential stiffness assembly (12) based on a sensed vibration from the source (14), and an actuator for varying a load applied to the differential stiffness assembly (12) in response to control signals from the controller (20). The differential stiffness assembly (12) includes an element such as a metallic tube (30), that provides a variable frequency-related vibration transmission/attenuation response depending on a load applied to the member. In one embodiment, a shape memory alloy wire (28) is interconnected to the tube (30) to apply a varying load to the tube (30) depending on a temperature of the wire (28).

16 Claims, 3 Drawing Sheets

DIFFERENTIAL STIFFNESS SYSTEM FOR ATTENUATING VIBRATIONS

FIELD OF THE INVENTION

The present invention relates in general to systems for reducing the transmission of vibratory energy from a driving source to an associated structure. In particular, the present invention relates to a support system that uses a differential stiffness characteristic to attenuate vibratory energy from a variable frequency driving source. The invention has particular advantages for certain aerospace, submarine and other applications where vibration control is a significant concern and the space or mass available for associated support structures is limited.

BACKGROUND OF THE INVENTION

Vibration attenuation systems are used in a variety of situations including mechanically isolating vibrating devices from external structures and isolating vibration sensitive instruments from external vibration sources. For example, in the submarine environment, it is often desired to attenuate vibrations from compressors, motors and other vibrating devices for a more quiet operation. In certain aerospace applications, it is important to isolate remote sensing, imaging and other optical bench instruments from vibration sources. Other applications where isolation from vibration is important include cryo-cooler applications. In such vibration attenuation systems it will therefore be appreciated that the driving source may be a vibrating device or an ambient or external vibration source. Moreover, the attenuation system may support the vibration source to isolate the source from an external structure, or the attenuation system may support a structure and isolate the structure from an external source of vibration.

Over the years, various techniques and systems have been developed for attenuating vibratory energy. For example, vibration isolation mounts including resilient materials for attenuating vibrations have been positioned between a support structure and a vibration source for mechanically isolating the vibration source from the structure. Another type of vibration attenuation system that has been proposed involves the use of a shape memory alloy. For example, shape memory alloys have been embedded within polymeric sheets that support vibrating devices. In principle, by heating or cooling the shape memory alloy, the stiffness of the sheet can be controlled to avoid undesired resonances. Unfortunately, due to the interaction of the elasticity of the sheet material with the variable elasticity of the shape memory alloy, as well as the limited variation in shape memory alloy elasticity, such vibration attenuation systems have provided a limited degree of vibration attenuation or frequency response in certain cases.

SUMMARY OF THE INVENTION

The present invention is directed to a vibration attenuation system that uses differential stiffness to tune the system's frequency response relative to a frequency of a driving source. Differential stiffness relates to the transverse stiffness of an element associated with and dependent upon the internal loads in the element that vary with compressive or tensioning loads. It has been recognized that this effect can be utilized in a vibration attenuation system to tune the system to attenuate a given driving frequency by varying a load on an element or elements of the system. Moreover, by appropriately controlling the resulting internal loads relative to a buckling point of a differential stiffness element, a substantial range of tuning can be achieved to attenuate a corresponding range of driving frequencies. Moreover, such a system can be implemented in a simple, lightweight and compact assembly suitable for a variety of aerospace, submarine and other applications. According to one aspect of the invention, a vibration attenuation apparatus is interposed between a driving source and a structure to be at least partially isolated from vibratory energy from the source. The apparatus includes at least one differential stiffness element, a mechanism for applying an internal load to the differential stiffness element, and a subsystem for selectively varying the applied internal load. The differential stiffness element can be, for example, a string, wire or other element for carrying a tensioning load and/or a structure such as a metallic tube or other support for carrying a compression load. The mechanism for applying the internal load preferably includes a mounting assembly interconnected to the differential stiffness element at two (or more) mounting locations, where the differential stiffness member is substantially mechanically independent from the mounting assembly (e.g., substantially free from contact with or otherwise substantially free from transmitting/receiving compressive or tensioning loads relative to the mounting subassembly) in an area between the two mounting locations. The subsystem for selectively varying the internal load can operate on the differential stiffness member internally e.g., by varying a modulus of elasticity of the differential stiffness member, and/or externally, by varying a compressive or tensioning load externally applied to the differential stiffness member. This load varying subsystem is capable of varying the load between at least a first value associated with a first frequency response of the apparatus and a second value associated with a second frequency response of the apparatus.

In a preferred implementation, the thermoelastic properties of SMA itself permits the SMA to be trained to provide more or less tension when its temperature is changed. The variation in modulus is by far a secondary effect. That is the simplicity of this preferred method. Simply by changing the temperature of the SMA wire, the system will change its frequency due to the internal load change.

According to another aspect of the present invention, a vibratory attenuating apparatus includes a deformable differentiating stiffness member having a particular buckling point. The buckling point relates to a compression limit above which the original shape of the system becomes unstable. The associated apparatus for attenuating vibratory energy further includes a compression subsystem for selectively applying first and second compression forces to the differential stiffness member, where at least one and preferably both of the first and second forces are less than the buckling point of the differential stiffness member. It has been found that, by applying compression forces approaching or in substantial proportion to the buckling point of the differential stiffness member, a substantial variation in frequency response can be obtained for a given variation in the applied compression load. In this regard, the first and second loads in conjunction with the buckling point preferably allow for varying a minimum vibration transmission frequency of the vibration attenuation apparatus by at least about 40%, and, more preferably, by at least about 60% (e.g., from less than 40 Hz to greater than 60 Hz) to accommodate different vibration modes of a driving source, i.e., different operating frequencies of a compressor. One of the loads is preferably at least about 25% and, more preferably, at least about 50% the buckling point. In one embodiment the differential stiffness element is a thin-walled aluminum tube having an outer diameter of 0.25" and wall thickness of about 0.03", and a buckling point of about 750 pounds of compression ($Lbs_c$) for a 24" tube length. The greater of the compressive loads applied to the aluminum tube (e.g., at two mounting locations) is about 500 $Lbs_c$.

According to another aspect of the present invention, a vibration attenuation apparatus includes two opposing differential stiffness members. In particular, the apparatus includes a first differential stiffness member, a second differential stiffness member, and a mechanism for interconnecting the first and second members such that a tensioning load applied to the first member results in a compressive load in the second member. For example, the first member can be a wire or other tension member and the second member can be a tube or other support structure, where the members are attached at ends thereof. In this manner, a load in the second member (e.g., support tube) can be varied by varying the opposing load in the first member (e.g., by tensioning a wire mounted within the tube).

According to a further aspect of the present invention, a vibration attenuation apparatus employs an SMA member to apply a variable load to a differential stiffness compression member. The apparatus includes a differential stiffness member, an SMA wire, an assembly for interconnecting the differential stiffness member and the SMA material so as to transmit loads therebetween, and a subsystem for varying the temperature of the SMA material. The SMA may include, for example, a shape memory alloy such as nickel titanium, nickel titanium copper, nickel titanium palladium, nickel titanium hafnium or other nickel titanium alloy. Such shape memory alloys allow for reversible changes in the load in the SMA as repeated heating and cooling of the alloy produces reversible crystalline phase transformations of the alloy. The subsystem for varying the load preferably includes a device for heating (e.g., electrically, radiantly, conductively, or convectively) the SMA material.

According to another aspect of the present invention, a tunable vibration attenuation apparatus is provided. The apparatus includes a differential stiffness assembly having a first frequency response including a first minimum vibration transmission frequency (i.e., frequency or frequency range wherein vibration transmission is less than at neighboring frequencies or frequency ranges) and a second frequency response including a second minimum vibration transmission frequency, a sensor for sensing a vibration frequency associated with a driving source, and a controller for controlling operation of the differential stiffness assembly in response to the sensed vibration frequency such that the differential stiffness assembly is tuned to provide a selected one of said first and second frequency responses. The sensor may include, for example, a frequency determination filter. The controller receives information regarding the sensed frequency and controls the operation of the differential stiffness assembly based on information regarding the known frequency responses of the differential stiffness assembly. In the case where a shape memory alloy is used to effect a change in frequency response, the controller is operative for heating (or cooling) the shape memory alloy as appropriate to provide the desired frequency response. In this manner, the apparatus can automatically respond to frequency changes of the driving source to enhance vibration attenuation.

According to a still further aspect of the present invention, plurality of differential stiffness assemblies are used to form a support structure for attenuating vibratory energy from a driving source. Each of the assemblies includes a differential stiffness element for attenuating vibratory energy from the source and a subsystem for varying an internal load of the differential stiffness element. The assemblies are arranged to define a support structure, e.g., for supporting a vibratory device or instrument structure to be isolated, and are preferably cooperatively controlled for enhanced vibration attenuation. In one embodiment, the assemblies are arranged in side-by-side relationship to define a platform for supporting a vibratory device or isolated instrument/structure.

The present invention thus uses a differential stiffness affect to attenuate vibratory energy from a driving source. The invention allows for substantial variation of a frequency response to address varying source frequencies. Moreover, the invention allows for simple, lightweight and compact construction as desired for various aerospace, submarine and other applications.

BRIEF DESCRIPTION OF THE DRAWINGS

For a more complete understanding of the present invention, and further advantages thereof, reference is now made to the following detailed description taken in conjunction with the drawings in which.

DETAILED DESCRIPTION OF THE INVENTION

The present invention relates to a vibration attenuation system for attenuating vibrations from a driving source. The system can be used to inhibit transmission of vibratory energy from a vibrating device such as a compressor, motor or the like to external structure, or inhibiting transmission of vibratory energy from external structure to a vibration sensitive device such as optics bench equipment. It will therefore be appreciated that the vibration attenuation system can be incorporated into a support structure for supporting a driving source or for supporting structure/instrumentation to be isolated, i.e., protected to some degree from vibrations of the driving source.

The vibration attenuation system is useful in a variety of applications, especially certain aerospace, submarine and similar applications. For example, in submarine applications, the system may be used to isolate a compressor or motor from surrounding structure so as to provide for more quiet operation. In aircraft or spacecraft applications, the system may be employed to isolate remote sensing, imaging or other optical bench instrumentation from vibrations due to operation of motors, thrusters or propulsion systems. In the following description, the invention is set forth in the context of a support system for isolating a vibrating device such as a compressor from a base structure. It will be appreciated that such a support structure is useful, for example, in certain submarine applications. However, it will be appreciated that various aspects of the invention may be advantageously employed in a variety of other applications.

Figure 1:
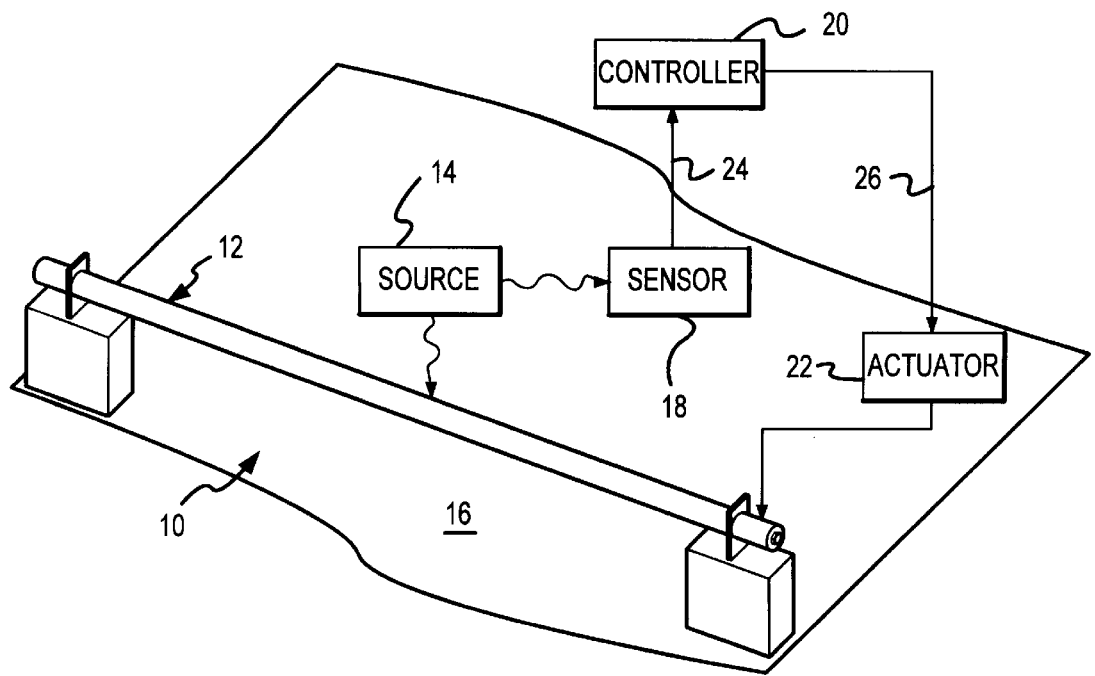
FIG. 1 is a perspective view of a vibration attenuation system in accordance with the present invention.

Referring to FIG. 1, a vibration attenuation system is generally identified by the reference numeral 10. Generally, the system 10 includes a differential stiffness assembly 12 interposed between a vibration source 14 and a base structure 16, a vibration sensor 18 for sensing a vibration from the source 14, a controller 20 for controlling operation of the differential stiffness assembly 12 based on, among other things, the sensed vibration from the source 14, and an actuator 22 for varying a load applied to the differential stiffness assembly 12 in response to control signals from the controller 20. Each of these components will be described in turn below.

The source 14 can be any of various vibrating devices, such as a compressor. It will be appreciated that such sources may be operated at various operating frequencies. For example, the illustrated source 14 is adapted for high speed and low speed operation. The high speed operating mode typically corresponds to an operating cycle of 60 to 65 Hz. The low speed operating mode may correspond to an operating cycle of 35 to 40 Hz. The source 14 is supported by an upper surface of the differential stiffness assembly 12. Although only a single assembly 12 is shown in FIG. 1 for purposes of illustration, it will be appreciated that multiple assemblies may be provided in side-by-side relationship to define a platform on which the source 14 may rest or multiple wires may be molded within a plate-like structure to form an assembly.

The differential stiffness assembly 12, in turn, rests on or is mounted to the base structure 16. The base structure 16 may be, for example, a support surface of a submarine. As will be understood upon consideration of the description below, the differential stiffness assembly 12 inhibits transmission of vibratory energy from the source 14 to the base structure 16. In this manner, the base structure 16 is mechanically isolated from the source 14 for more quiet operation as desired for submarine applications. The differential stiffness assembly 12 will be described in greater detail below.

The sensor 18 provides feedback concerning the frequency of the source 14 for use in tuning the differential stiffness assembly 12. In this regard, the sensor 18 may be mounted on or near the source 14 so as to sense vibrations emanating from the source 14. Any suitable vibration sensor may be employed. Typically, such sensors include a strain gauge, accelerator, or electromechanical transducer for providing an electrical output signal in proportion to a received mechanical vibration. In the illustrated embodiment, the sensor 18 includes a frequency determination filter. The filter determines the frequency of a vibration from the source 14 and provides an output signal to the controller 20 including information regarding the sensed frequency.

The controller 20 controls operation of the differential stiffness assembly 12 to enhance vibration attenuation, i.e., to minimize the transmission of vibratory energy from the source 14 to the base structure 16. In particular, as will be understood from the description below, the differential stiffness assembly 12 includes at least two different frequency responses depending upon the loading of the assembly 12. The controller 20 stores information regarding these frequency response characteristics. For example, the differential stiffness assembly 12 may be designed such that it has a first operating state, corresponding to a first loading condition, that minimizes transmission of vibrations having a first frequency corresponding to low speed operation of the source 14, and a second state of operation, corresponding to a second loading condition of the differential stiffness assembly 12, that minimizes transmission of vibrations having a second frequency corresponding to high speed operation of the source 14. In such a case, the controller 20 preferably stores information correlating the operating states or loading conditions of the differential stiffness assembly 12 to the operating speed of the source 14 as indicated by the sensed vibrations. In this manner, the illustrated controller 20 receives the input signal 24 from the sensor and obtains information regarding a frequency of the source 14 based on the input signal 24, determines a loading condition or operating state for the differential stiffness assembly 12 based on the stored information correlating source frequency to assembly operating state, and outputs control signals 26 to the actuator 22 indicative of the determined operating mode.

The actuator 22 controls the operating state of the differential stiffness assembly 12 by varying the loading of the assembly in response to the control signals 26. In this regard, the differential stiffness assembly 12 includes at least one element having a frequency response that varies depending on the internal loading of the member. This internal loading can be varied in a number of ways. For example, the internal loading can be varied by externally applying a tensioning or compressive force to the member. In the illustrated embodiment, the differential stiffness assembly 12 includes a shape memory alloy having an internal tension that varies between two states as a function of temperature. Accordingly, the illustrated actuator 22 includes a heater for heating the shape memory alloy. The shape memory alloy may be heated electrically, radiatively, conductively, convectively or by any other suitable heating process. The illustrated actuator 22 preferably provides an electrical signal for heating the shape memory alloy. In particular, where the shape memory alloy has suitable electrical resistance characteristics, an electrical current may be applied directly to the shape memory alloy to generate heat. Alternatively, an electrical resistance wire may be thermally coupled to the shape memory alloy to conductively apply heat to the shape memory alloy. In either case, the actuator 22 is capable of providing a first electrical signal associated with a low temperature state of the shape memory alloy and a second electrical signal (i.e., a first current) associated with a high temperature state of the shape memory alloy. These two states correspond to two different crystalline phases of the shape memory alloy and two different states of internal tension load.

Figure 2:
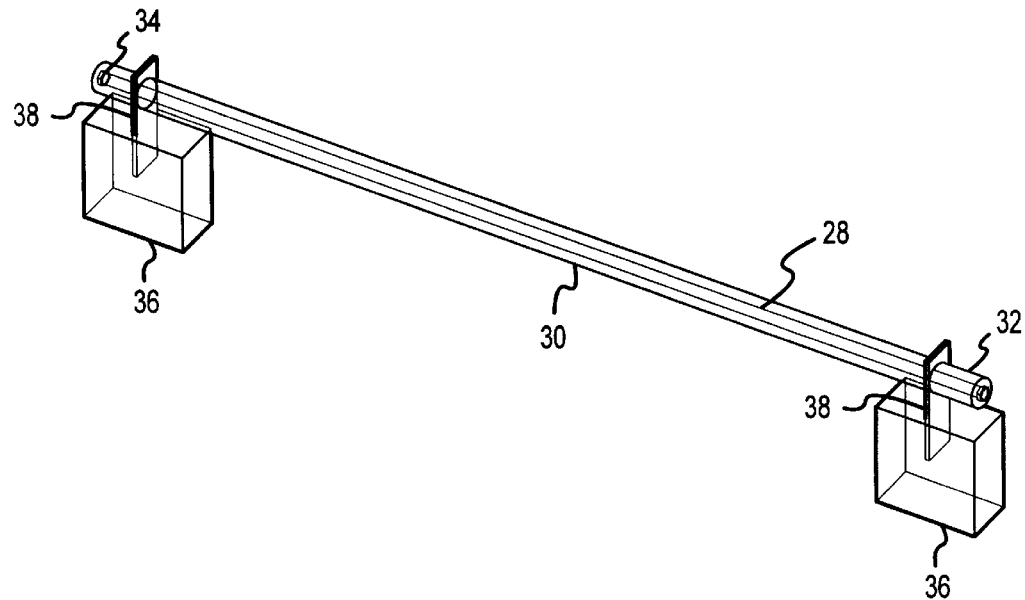
FIG. 2 is a wireframe cutaway of the vibration attenuation system of FIG. 1 showing certain internal features of the system.

FIG. 2 shows a wireframe cutaway of the differential stiffness assembly 12 of system 10. The assembly 12 includes a shape memory alloy wire 28 mounted within a hollow tube 30. The shape memory alloy wire 28 is preferably a two-way shape memory alloy wire trained to be shorter in length than the nominal length of the assembly. That is, the wire 28 can be reversibly transformed between two crystalline states corresponding to two different moduli of elasticity. The transition from one state to the other is associated with a temperature change across a transition temperature. By way of example, the shape memory alloy wire may be formed from nickel titanium, nickel titanium copper, nickel titanium palladium, nickel titanium hafnium or other nickel titanium alloys. Such shape memory alloy materials can be trained to provide an internal tension which increases with increases in temperature. More specifically, the wire 28 has a first tension at a first temperature and a second tension greater than the first tension elasticity at a second temperature greater than the first temperature.

The wire 28 is attached to the tube 30 at opposite ends of the tube 30. Preferably, the wire 28 is mounted within the tube such that the wire is held in tension between the tube ends and is centered or mounted coaxially within the tube 30 so as to minimize or eliminate contact between the wire 28 and the tube 28 between the tube ends. In this regard, the wire 28 may extend through the center of suitable end fittings of tube 30 and is secured to the respective fittings 32 by nuts 34. During construction, the nuts can be turned to provide the appropriate tensioning of the wire 28.

The tube 30 is preferably selected in conjunction with the wire 28 to provide the desired adjustability of the vibration transmission/attenuation characteristics of the differential stiffness assembly 12. More specifically, it has been found that the vibration attenuation characteristics of the differential stiffness assembly 12 can be more effectively controlled if the forces applied on the tube 30 by the wire 28 approach, or are significant in relation to the buckling point of the tube 30. It will be appreciated that the shape memory characteristics of the wire 28 are used in the illustrated embodiment to apply a varying force to the tube 30 and do not necessarily involve any change of shape of the wire 28. In this regard, the wire 28 may be thought of as being trained to return to a shortened condition upon heating to a temperature above the transition temperature of the shape memory alloy and to lengthen upon cooling. Because the wire 28 is mounted to the tube end fittings 32, the wire cannot change length when heated or cooled. As a result, the wire 28 will experience greater tension when heated to its high temperature state and less tension when cooled to its low temperature state.

Conversely, the tension forces in wire 28 will exert compression forces on the tube 30 via the end fittings 32. Accordingly, when the wire 28 is in its high temperature/high tension state, the tube 30 will experience increased compression forces. When the wire 28 is in its low temperature/low tension state, the compression forces in tube 30 will be reduced. The tube 30 thus has a low compression state and a high compression state corresponding to the low tension state and high tension state of the wire 28. The high compression state preferably involves compression forces that are at least 25 percent and more preferably at least about 50 percent of the buckling point of the tube 30. In the illustrated embodiment, the tube 30 is formed from aluminum and has a wall thickness, T, of about 0.03 in. The buckling point for the tube 30 is about 750 pounds of compression. The wire 28 is formed from a nickel titanium alloy and carries a tension, in its high tension state of about 500 pounds of tension. Accordingly, in the high compression state, the tube 30 experiences a compression force of about 500 pounds of compression. In the low compression state, the tube 30 experiences a compressive force of about 20 pounds of compression. It will thus be appreciated that the shape memory alloy wire 28 interacts with the tube 30 to provide variable vibration transmission/attenuation characteristics.

The tube 30 is preferably supported in a manner that allows the tube 30 to flex without contacting the base structure 16. In the illustrated embodiment, tube 30 is supported by base blocks 36 by way of flexible mounts. The blocks 36, provide physical separation between the base structure 16 and the tube 30. The flexible mounts, which may be torlon washers or other flexible supports, accommodate some flexing or expansion/contraction of the tube 30 due to varying compression forces.

Figure 3:
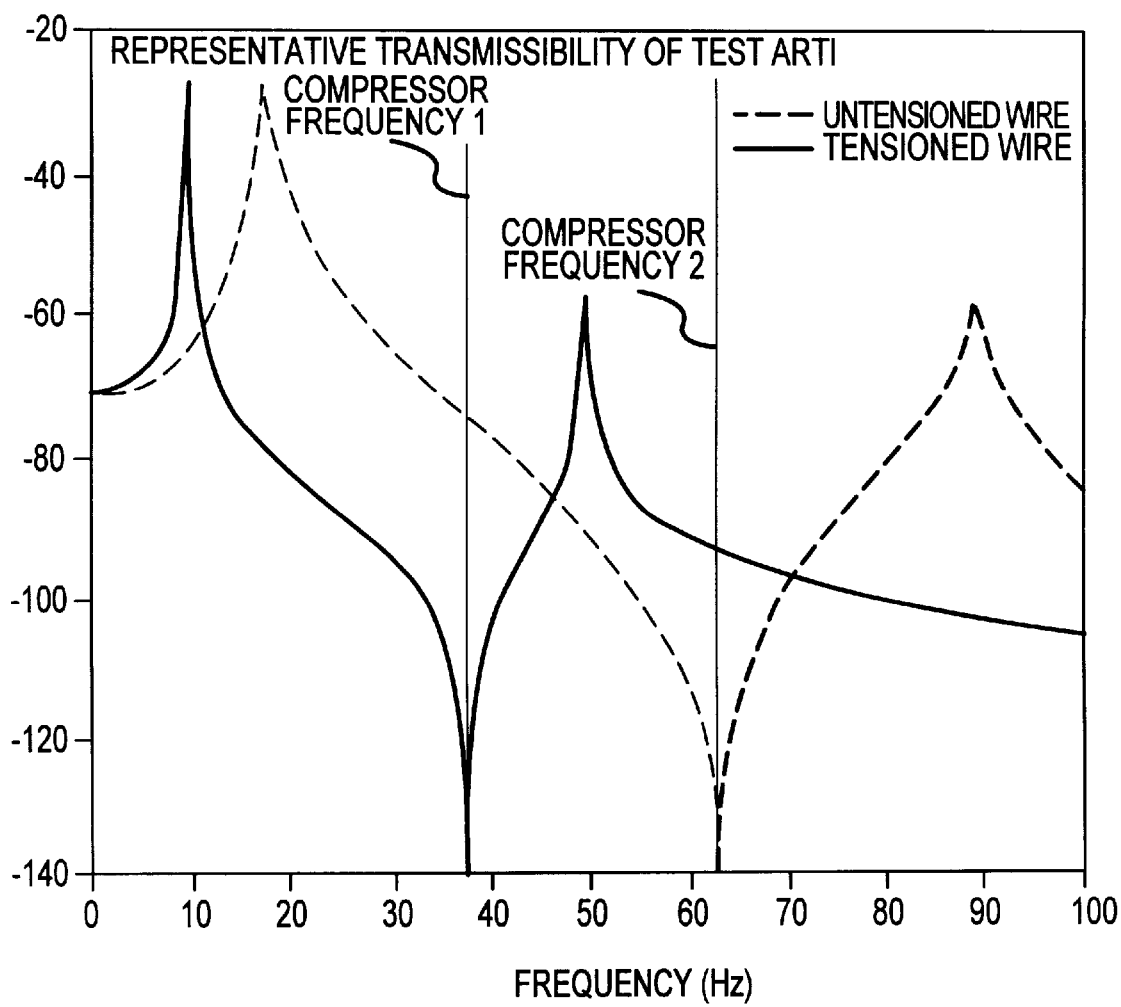
FIG. 3 is a graph showing a representative transmissibility function corresponding to two different frequency responses of a vibration attenuation system in accordance with the present invention.

FIG. 3 is a representative transmissibility transfer function illustrating such a variable frequency response. The graph plots vibration transmissibility/attenuation (in decibels relative to a reference vibration magnitude) against frequency expressed in Hz. Two separate curves are illustrated corresponding to the two different loading states of a differential stiffness assembly such as the assembly 12 of FIGS. 1–2. More particularly, the solid curve of FIG. 3 corresponds to the high tension/high compression state of the assembly and the dashed curve corresponds to the low tension/low compression state of the assembly. As shown, each of the curves includes a relative minimum transmissibility value between the peaks associated with the first and third resonant modes of the assembly. The assembly of FIG. 3 is designed so that, in the low compression/low tension state, the transmissibility curve has a minimum between about 60 to 65 Hz. In the high tension/high compression state, the assembly has a minimum transmissibility in about the 35 to 40 Hz range. These values closely correspond to a high speed operating frequency and a low speed operating frequency of a compressor to be supported on a vibration attenuation system such as system 10 of FIGS. 1–2. Accordingly, the vibration attenuation system can be operated in a low tension/low compression state when the compressor is operated at a high speed frequency, and the system can be operated in a high tension/high compression state when the compressor is operated at a low speed frequency so as to tune the frequency response of the system relative to operation of the compressor.

Figure 4:
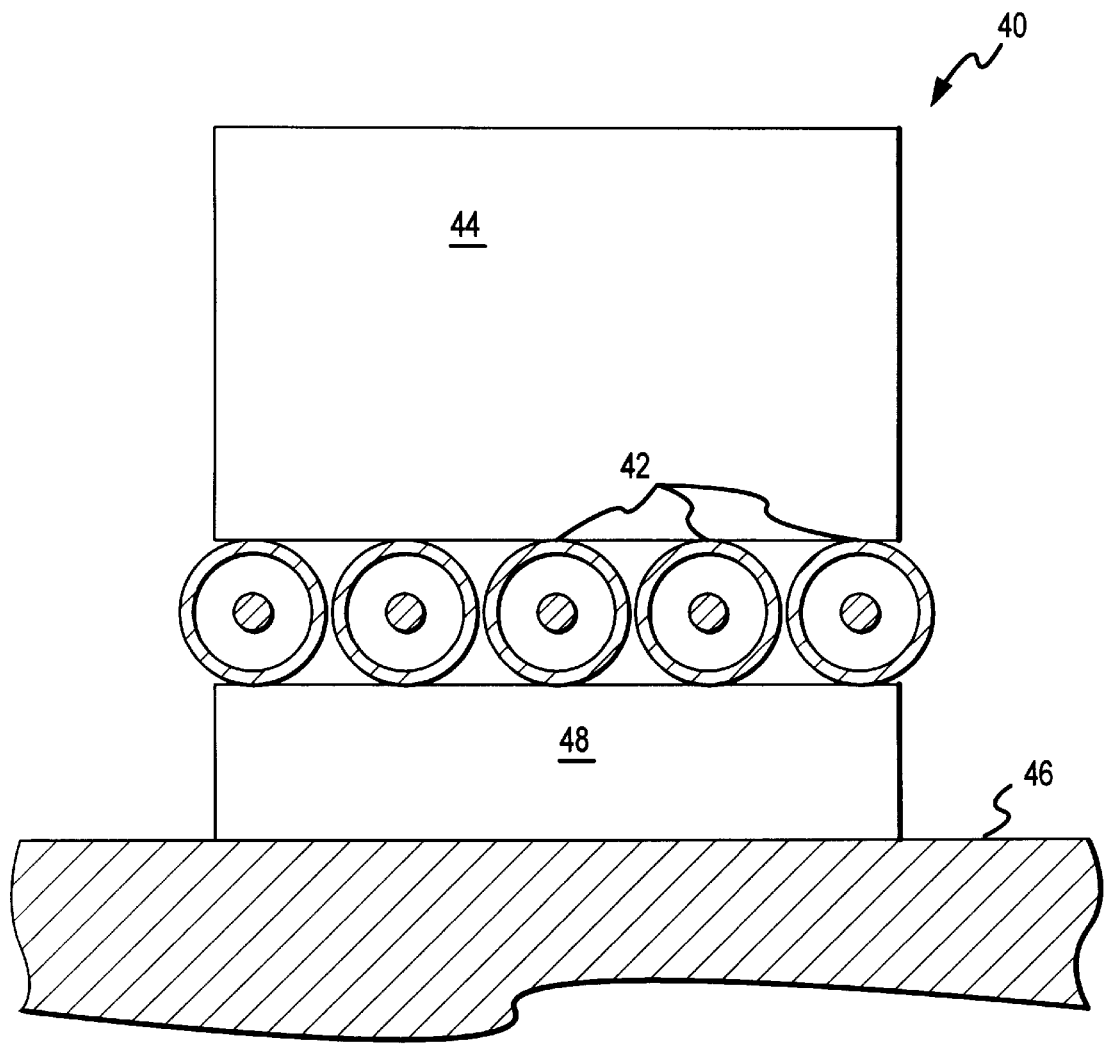
FIG. 4 is a side, partially cross-sectional view of a vibration attenuation system disposed between a vibrating device and a base structure in accordance with the present invention.

FIG. 4 illustrates a vibration attenuation system 40 employing a number of differential stiffness assemblies 12. The system 10 is disposed between a vibrating device 44 such as a compressor and a base structure 46. As shown, the assemblies 42 are arranged in side-by-side relationship so as to define a platform for supporting the vibrating device 44 at its lower surface. The system 40 further includes blocks 48 for supporting the assemblies 42 on the base structure 46. Although not shown, the assemblies 42 are associated with appropriate control components as discussed above, so that the frequency response of the system 40 can be tuned relative to a frequency of the vibrating device 44. In this regard, the assemblies 42 are preferably cooperatively controlled such that all of the assemblies 42 are typically in the same operating state, i.e., high compression or low compression.

While various embodiments of the present invention have been described in detail, it is apparent that further modifications and adaptations of the invention will occur to those skilled in the art. However, it is to be expressly understood that such modifications and adaptations are within the spirit and scope of the present invention.

What is claimed is:

1. An apparatus for use in attenuating vibratory energy from a driving source, comprising:

differential stiffness means for providing a first vibration attenuation frequency response associated with a first internal load of said differential stiffness means and a second vibration attenuation frequency response associated with a second internal load of said differential stiffness means; and means for selectively varying an internal load of said differential stiffness means so as to provide a selected one of said first and second internal loads associated with said respective first and second vibration attenuation frequency responses, wherein said differential stiffness means comprises a shape memory alloy element interconnected to a second element and said means for varying comprises means for heating said shape memory alloy element, wherein said shape memory alloy element applies a load to said second element.

2. An apparatus as set forth in claim 1, wherein said differential stiffness means comprises an element for supporting a variable tensioning load.

3. An apparatus as set forth in claim 1, wherein said differential stiffness means comprises an element for supporting a variable compression load.

4. An apparatus as set forth in claim 1, wherein said means for varying comprises mounting means interconnected to said differential stiffness means at two mounting locations, wherein said differential stiffness means is substantially mechanically independent from said mounting means in an area between said two mounting locations.

5. An apparatus as set forth in claim 1, wherein said means for varying comprises means for varying a modulus of elasticity of said differential stiffness means.

6. An apparatus as set forth in claim 1, wherein said means for varying comprises means for externally applying a load to said differential stiffness means.

7. An apparatus for attenuating a vibratory energy associated with a driving source, comprising:

first differential stiffness means having a first vibration attenuation frequency response associated with a first internal load of said first means and a second vibration attenuation frequency response associated with a second internal load of said first means of said second means;

second differential stiffness means, having a first vibration attenuation frequency response associated with a first internal load of said second means and a second vibration attenuation frequency response associated with a second internal load of said second means;

interconnecting means for opposingly interconnecting said first and second differential stiffness means such that a load applied to the first differential stiffness means results in an opposing load in said second differential stiffness means; and means for applying a load to said first differential stiffness means.

8. An apparatus for attenuating vibratory energy from a driving source, comprising:

differential stiffness means having a first vibration attenuation frequency response associated with a first internal load of said differential stiffness means and a second vibration attenuation frequency response associated with a second internal load of said differential stiffness means, said differential stiffness means including an element having a buckling point, wherein loads greater than said buckling point result in static instability of said member;

loading means for selectively applying a first compression load and a second compression load to said differential stiffness means, wherein said first compression load is less than said buckling point of said member.

9. An apparatus as set fort in claim 8, wherein said second load is greater than said first load, and said second load is at least about 40 percent of said buckling point.

10. An apparatus as set forth in claim 9, wherein said second load is at least about 60 percent of said buckling point.

11. An apparatus for use in attenuating vibratory energy from a driving source, comprising:

differential stiffness means for providing a first vibration attenuation frequency response associated with a first internal load of said differential stiffness means and a second vibration attenuation frequency response associated with a second internal load of said differential stiffness means; and means for selectively varying an internal load of said differential stiffness means so as to provide a selected one of said first and second internal loads associated with said respective first and second vibration attenuation frequency responses, wherein said means for varying comprises mounting means interconnected to said differential stiffness means at two mounting locations, and said differential stiffness means is substantially mechanically independent from said mounting means in an area between said two mounting locations.

12. An apparatus for use in attenuating vibratory energy from a driving source, comprising:

differential stiffness means having a first vibration attenuation frequency response including a first minimum vibration transmission frequency and a second vibration attenuation frequency response including a second minimum vibration transmission frequency;

sensor means for sensing a vibration frequency associated with said driving source; and control means for controlling operation of said differential stiffness means in response to a sensed vibration frequency such that said differential stiffness assembly provides a selected one of said first and second frequency responses, wherein said differential stiffness means comprises a shape memory alloy element interconnected to a second element and said control means comprises means for heating said shape memory alloy element, wherein said shape memory alloy element applies a load to said second element.

13. An apparatus as set forth in claim 12, wherein said sensor means comprises a frequency determination filter.

14. An apparatus for attenuating a vibratory energy associated with a driving source, comprising:

a plurality of differential stiffness assemblies, each of said assemblies including a differential stiffness means having a first vibration attenuation frequency response associated with a first internal load of said element and a second vibration attenuation frequency response associated with a second internal load of said element, wherein said differential stiffness means comprises a shape memory alloy element interconnected to a second element and means for heating said shape memory alloy element such that said shape memory alloy element applies a load to said second element; and means for arranging said plurality of said assemblies so as to define a support structure for supporting said driving source.

15. An apparatus as set forth in claim 14, wherein said means for arranging comprises means for disposing said plurality of differential stiffness assemblies in side-by-side relationship to define a platform, or integral molding or machining of these means to provide an assembly.

16. An apparatus for use in attenuating vibratory energy from a driving source, comprising:

differential stiffness means for providing a first vibration attenuation frequency response associated with a first internal load of said differential stiffness means and a second vibration attenuation frequency response associated with a second internal load of said differential stiffness means, wherein said differential stiffness means comprises an element for supporting a variable compression load; and means for selectively varying an internal load of said differential stiffness means so as to provide a selected one of said first and second internal loads associated with said respective first and second vibration attenuation frequency responses.

* * * * *